June 4, 1974 W. WAGNER 3,814,643

METHOD OF APPLYING TAPE

Filed May 22, 1972 4 Sheets-Sheet 1

June 4, 1974 W. WAGNER 3,814,643

METHOD OF APPLYING TAPE

Filed May 22, 1972 4 Sheets-Sheet 2

June 4, 1974 W. WAGNER 3,814,643

METHOD OF APPLYING TAPE

Filed May 22, 1972 4 Sheets-Sheet 3

METHOD OF APPLYING TAPE

Filed May 22, 1972

United States Patent Office 3,814,643
Patented June 4, 1974

3,814,643

METHOD OF APPLYING TAPE

Walter Wagner, 2 Spring Drive, Dumont, N.J. 07628

Continuation-in-part of application Ser. No. 33,546, May 1, 1970, now Patent No. 3,677,865, dated July 18, 1972. This application May 22, 1972, Ser. No. 255,658
Int. Cl. E04b 2/00
U.S. Cl. 156—71 8 Claims

ABSTRACT OF THE DISCLOSURE

Masking tape is applied along an edge of one surface by moving a tape roll carrying carriage over an adjacent angularly related surface, either by hand or with an extension handle adapted to be demountably connected to the carriage to provide universal angular movement of the handle relative to the carriage and to coact with a guide and abutment member extending laterally from the carriage to the surface on which the tape is to be applied.

FIELD OF THE INVENTION

This application is a continuation-in-part of copending application Ser. No. 33,546, filed May 1, 1970 which matured into U.S. Pat. No. 3,677,865, July 18, 1972.

This invention relates to a device adapted primarily for applying tape to one surface by moving it over an adjacent angularly related surface. While it has many useful applications, its use is particularly contemplated for placing a strip of masking tape along one surface in substantially abutting relation to another, angularly related, surface. It is particularly useful in preparing for painting a wall or ceiling of a room by placing a strip of masking tape along the adjacent edge of the adjoining walls, walls, ceiling, floor or carpet. An advantage of the device is that it is able to guide and dispense a length of masking tape onto one wall at a corner of the room in close abutting relation to an adjoining wall. The adjustable wheel mounting compensate for differences in width of the tape and insure that the inner edge of the tape will be applied in abutting relation to an adjoining surface.

The lateral abutment acting in conjunction with the extended handle facilitates applying tape on a ceiling adjoining one of the wall surfaces, or on a wall surface above the reach of the operator.

While the device disclosed herein is a carriage comprising a frame mounted on wheels for moving the device over one wall while it is applying tape on to another angularly related wall, the device may also be used without contact between the wheels and a wall. For example, if it is desired to paint a baseboard molding of a room which has wall to wall carpeting, the device may be employed to apply tape over the edge of the carpet adjoining the molding even though the molding will prevent the wheels of the device from contacting and riding on the adjacent side wall.

The tape guide means employed and the adjustable position of the pressure roll relative to the plane of the tape roll prevent lateral displacement of the tape and cause it to adhere chiefly along its inner edge. In the case of applying tape to a carpet adjacent a baseboard molding, it will be found that the near edge of the tape will be turned down between the carpet and the molding while the outer edge of the tape, remote from the molding, may be substantially free or only lightly adhering to the surface of the carpet. This result is accomplished by the adjustable offset position of the pressure roll relative to the tape roll.

The word "wall" is used broadly herein and it will be understood that the applicator disclosed herein may be used for masking not only side walls and ceilings and floors but also window glass, and a floor or carpet as when painting baseboards.

SUMMARY OF THE DISCLOSURE

A frame is provided, which may be T shaped and has wheels on which it may be moved over a wall surface. At each end of the cross bar of the frame a guide roll and an applicator or pressure roll are mounted. A roll of tape may be mounted under the frame so that it will deliver either to the right or left hand of a person using the device. Adjacent each combination of a guide roll and an applicator roll is a tape cutter disposed close to the periphery of a tape roll mounted under the frame. The cutter is spaced inwardly from the path followed by the tape while the tape roll is rotating and the tape is being unwound and applied to a wall surface. But the tape may be pushed against the cutter, or drawn back against cutter, and cut off by stopping rotation of the tape roll while the applicator is moving or by rotating the tape roll in reverse.

The rolls comprising each combination of a guide roll and a pressure roll coact in advancing the tape but they are not necessarily exactly aligned. Each guide roll preferably has an abutment along one side which is effective in preventing the unwinding tape from moving laterally, as for example away from the corner or interface with an adjoining angularly related surface, even if the roll of tape being used tends to wobble on its mounting. The width of the pressure roll is preferably less than the width of the tape being applied and the position of the pressure roll is adjustable toward and away from the frame to cause the center line of the pressure roll to be slightly offset relative to the center line of the tape roll so that the applying pressure is exerted chiefly along the inner edge of the tape leaving the outer edge of the tape free or only lightly adhering to the surface to which it is applied, which result not only facilitates removal of the tape but also helps to prevent damage to the surface when the tape is removed.

The wheel mounting are adjustable toward and away from the frame to compensate for differences in the width of rolls of tape so that the roll of tape may be supported as close as possible to a wall over which the device is moved on the said wheels and so that the tape delivered laterally of the device will be applied to one wall with is edge substantially touching an angularly related wall.

The position of the cutter may be such relative to the length of the carriage that when the carriage reaches an end of its travel over one wall the tape may be severed at a point which will provide an as yet unsecured free end of tape long enough to reach to the end of the surface on which the tape is being applied. This free end of tape may of course be smoothed down and applied to the surface as by the operator's finger.

A demountable lateral abutment member is provided and the frame is formed with a transverse socket for mounting the abutment member by inserting its rear end in the socket. A wheel or roller is provided at the outer end of the abutment member for making rolling contact with the surface on which the tape is to be applied, the length of the abutment member including the roller being such that the contact surfaces of the tape applicator roll and of the wheel or roller carried at the outer end of the abutment member will be aligned. The carriage frame member may be formed with an internal storage chamber in which the detachable lateral abutment member may be stored when not in use.

The invention will best be understood by reference to the accompanying drawings in which, FIG. 1 is an end view of an embodiment of the invention, FIG. 2 is a bottom plan view, FIG. 3 is a side elevation, FIG. 4 is a cross section taken on the lines 4—4 of FIG. 2, FIG. 5 is a detail cross sectional view taken on the lines 5—5 of FIG. 2, FIG. 6 is a detail cross sectional view taken on the lines 6—6 of FIG. 2, FIG. 7 is a front view of the device showing tape being applied to a ceiling while the applicator is being moved toward the viewer over a side wall, with the ceiling and side wall indicated in cross section, FIG. 8 is an enlarged view of a portion of FIG. 7 showing a pressure roll pressing a length of masking tape, as it is unwound from the tape roll, along a ceiling in close proximity to a side wall on which the wheels of the applicator are traveling, FIG. 9 is a detail view partly in section showing the device traveling along a baseboard while tape is being laid over the adjacent edge of a carpet which extends to the baseboard, and illustrating how the pressure roll, being a little narrower than the tape, exerts its pressure more on the edge of the tape which is adjacent the baseboard than on the edge which is further inward of the carpet, FIG. 10 shows in cross section a strip of tape after it has been applied along the edge of the carpet and illustrates the result of applying greater pressure along the inner edge of the tape with the result that the inner edge actually turns down over the edge of the carpet adjacent the baseboard, while its opposite edge is left free or adhering only lightly to the surface of the carpet, FIG. 11 illustrates the device being used for placing a strip of masking tape along the edge of a window or door frame while the device is being moved over the surface of a wall in which the window or door frame is located, FIG. 12 is a detail cross sectional view taken on the line 12—12 of FIG. 11, FIG. 13 is a view partly in section taken on the line 13—13 of FIG. 11 and looking at the edge of the applicator device which is remote from the door or window frame which is being masked, FIG. 14 is a view of the device partly cut away and partly in section showing the applicator equipped with a stop or spacing member projected in front of the applicator and touching a ceiling while the wheels of the applicator rest on one side wall and tape is being applied to an angularly related side wall close to the angular interface between the two side walls, FIG. 15 illustrates how, the spacing member having been projected ahead of the device a distance equal to the length of the portion of the tape between the cutter and a point on the pressure roll tangential to the wall over which the tape *t* is being applied, the tape having been cut off, as by a twist of the wrist of the operator, the free end of the tape may be applied by the operator's finger and will extend precisely up to the ceiling.

Figure 18:
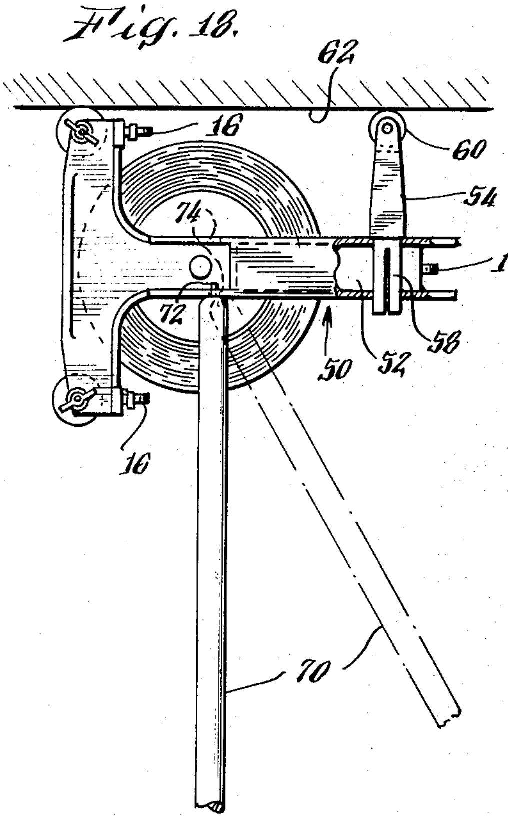
Figure 19:
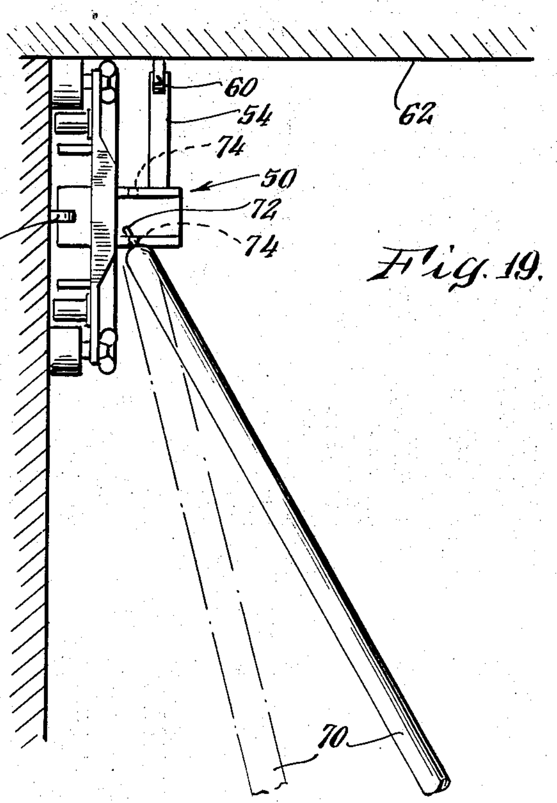

FIG. 18 is a top plan view of the modified frame portion sectioned horizontally to show a transverse socket through the frame portion with the rear end of the guide member seated in the socket and with the roller which is carried at its forward end extending laterally from the frame into contact with an adjacent and angularly related wall or ceiling surface, and FIG. 19 is a side view of the tape applicator with its wheels travelling on one wall surface or ceiling and applying tape along the edge of an adjoining wall or ceiling, and with the laterally extending guide also travelling on said adjoining wall or ceiling and serving as a gauge which ensures the tape will be applied close to the corner or interface between the two surfaces. The view shows the applicator being held in the described position, above or beyond the operator's unassisted reach, by an extension handle detachably connected to the application frame in a way which permits angular movement of the handle relative to the frame.

DESCRIPTION

In the illustrated embodiment of the invention a substantially T-shaped frame comprises, a longitudinal frame member 10 which is offset intermediate its ends and bent down at its rear end, and a cross frame member 12. A roller 14 is mounted at the lower end of the bent down rear end of the longitudinal frame member 10, and a pair of rollers 16, 16 are mounted under and adjacent the respective ends of the cross member 12. The rollers 16 are carried by the downwardly extending ends of a cross bar 18, mounted by pin and slot connections to upturned brackets on the cross frame member 12 for adjustment in a plane normal to the frame. The upturned brackets of cross frame member 12 are identified by numeral 19, the slots in cross bar 18 are identified by the numeral 20, and the "pins" are shown as thumb screws 22, extending through the slots 20 and through the brackets 19.

A hub 24 is mounted for rotation under the frame, as by member 25 which is part bearing and has a screw threaded end which extends through the frame. The bearing portion of member 25 provides a seat on which a roll of tape may be supported for rotation in a plane parallel to, or substantially parallel to, the plane of the frame and to a surface over which the applicator is being moved. It will be noted the plane of the roll of tape may be adjusted toward and away from the surface by raising and lowering cross bar 18.

As shown the hub 24 is cup-shaped with strengthening radial webs 26. Knobs 27 project from the periphery of the hub. They serve to compensate for slight variations in the internal diameter of tape rolls.

Also supported beneath the frame on either side, and adjacent the periphery of a roll of tape T mounted on its support hub 24, is the combination of a cutter 28, a guide roll 30 and a pressure roll 32 Tape may be drawn from the tape roll and passed over either guide roll and pressure roll combination with the adhesive face out. By placing the free end of the tape *t* on a wall surface and moving the applicator forward over an angularly related wall the tape may be unwound from the tape roll and, depending upon which side of the tape roll is up, the tape may be made to move around either set of rollers 30, 32 and applied laterally of the frame to a wall surface close to its interface with an adjoining wall.

Figure 14:
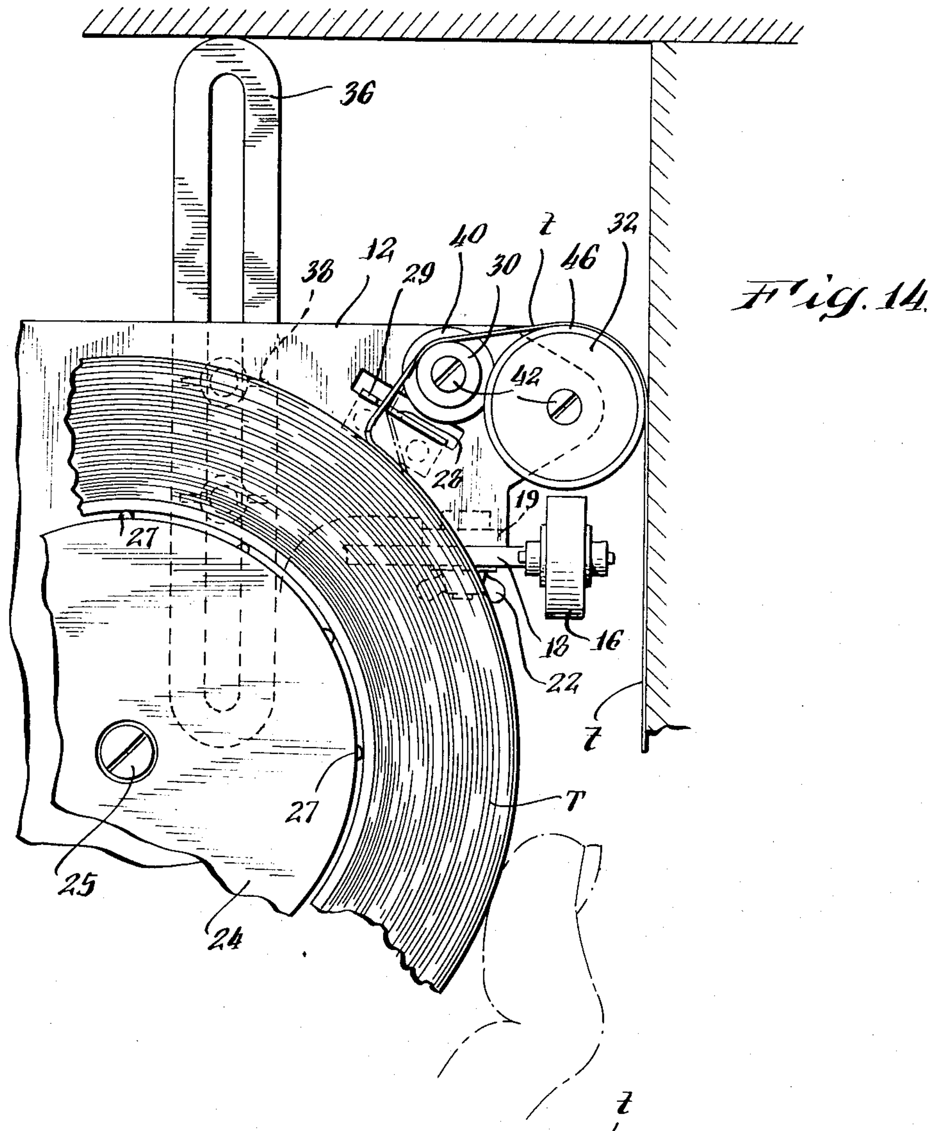
Figure 15:
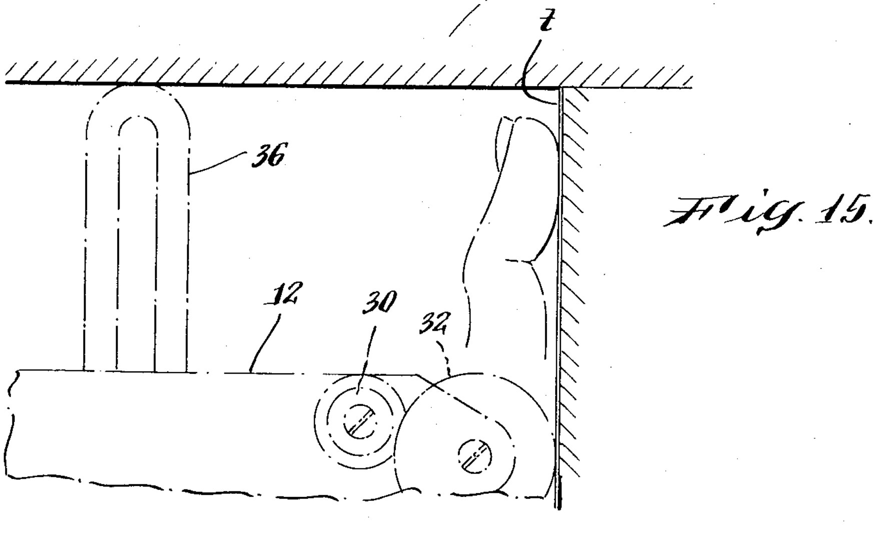

Each cutter member 28 comprises an angular member with serrated teeth directed toward the tape as it travels from the tape roll to a guide roll 30. Each member 28 is disposed adjacent the path of the tape but is spaced sufficiently from the tape so that the latter does not come in contact with cutter 28 while the tape roll is rotating. When the operator wishes to cut off the tape he may accomplish this simply by pressing his finger on the tape roll and stopping its rotation. A slight further forward movement of the device brings the tape back against the cutter and cuts it off close to the point where it separates from the roll. Cutting off of the tape may also be accomplished by manually rotating the tape roll in reverse, as for example when the applicator is in the position shown in FIG. 14 with the stop-spacing member 34 extended in front of the device and abutting against a wall surface. As shown member 34 has a longitudinal slot 36 and may be held in projected or withdrawn positions by means of thumb screws 38 extending through slot 36 into the frame.

Figures 5, 6, 7, 8, 9, 10, 11, 12, 13:
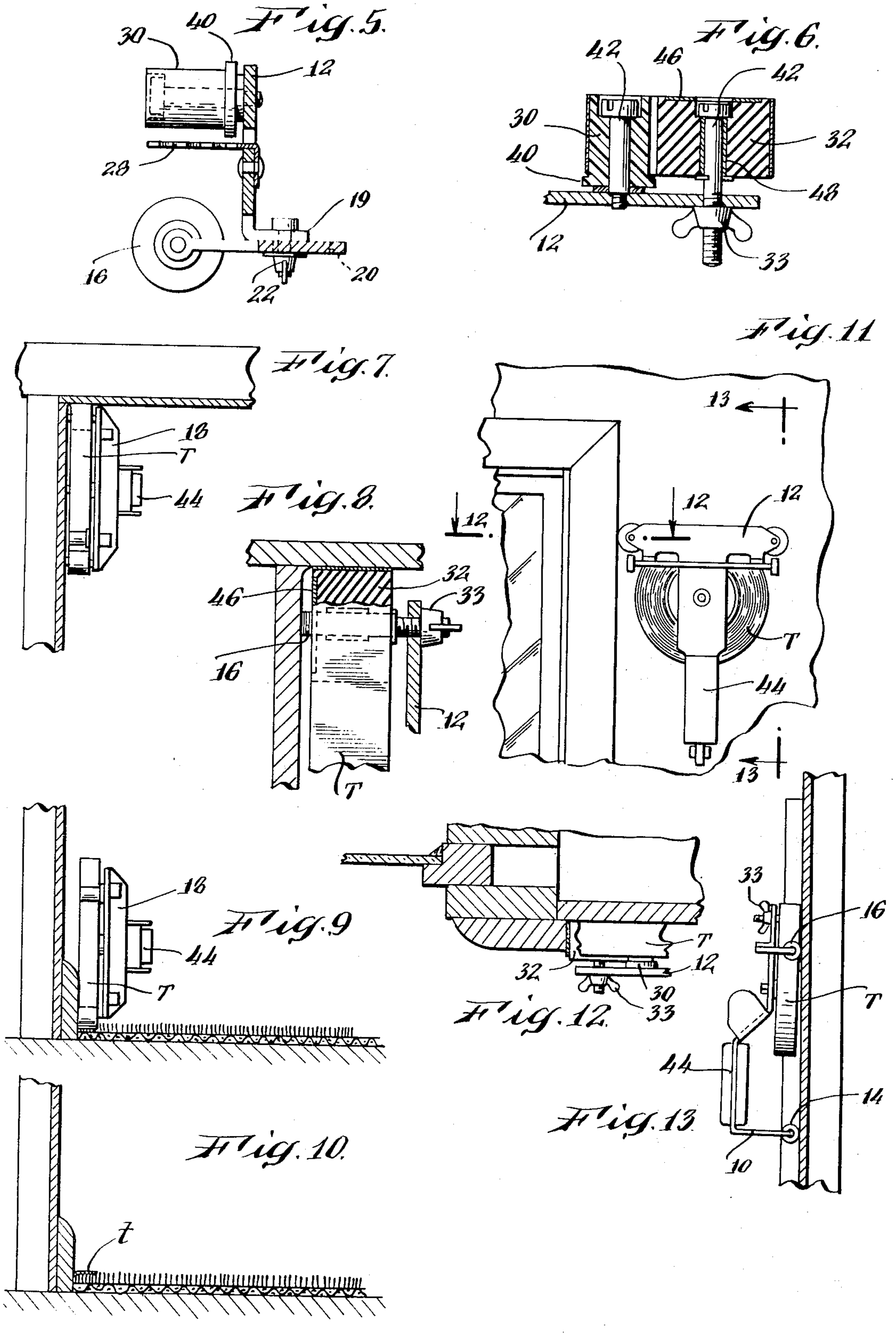

As shown in FIG. 5 each guide roll 30, at its end which is proximate to the frame, which is the outer end of the guide roll with respect to the wall angularly related to the wall on which the tape is being applied, has a shoulder 40 which prevents the unwinding tape from moving laterally away from the corner or interface between the two angularly related walls.

Each guide roll 30 and each pressure roll 32 is mounted for rotation on a bearing shaft 42 depending from the cross frame member 12, and which may be similar to bearing screw 25. At least each pressure roll 32 is adjustable toward and away from the supporting frame to control the alignment and non-alignment of the pressure roll with its guide roll 30 and with the tape roll T. It is desirable for the pressure roll to press on the inner edge of the length of tape being applied to a surface more than on its outer edge to cause the tape to adhere firmly to the surface along its inner edge, which is the edge in abutting relation to the adjoining angularly related surface, leaving its outer edge free or only lightly adhering to the surface. This enables the tape to be moved from the surface more readily and substantially eliminates the likelihood of damage to the surface during removal of the tape.

It will be understood that in use the operator grasps the suitcase type handle provided by the offset portion 44 of the longitudinal frame member 10 and advances the device after leading an end of the tape past the cutter and over the guide and pressure rollers. When possible the wheels of the device are rested on one surface which may be a surface to be painted, while the pressure roller is pressed against an adjoining angularly related surface to apply a strip of tape over it so that paint will not be accidentally smeared on said adjoining surface when paint is applied to the surface to be painted.

Tape is supplied in different widths and the position of the shoulder 40 on guide roll 30 may in effect be moved inwardly along the guide roll to compensate for narrower widths by slipping a collar (not shown) on the guide roll in abutting relation to the shoulder 40.

Figures 1, 2, 3:
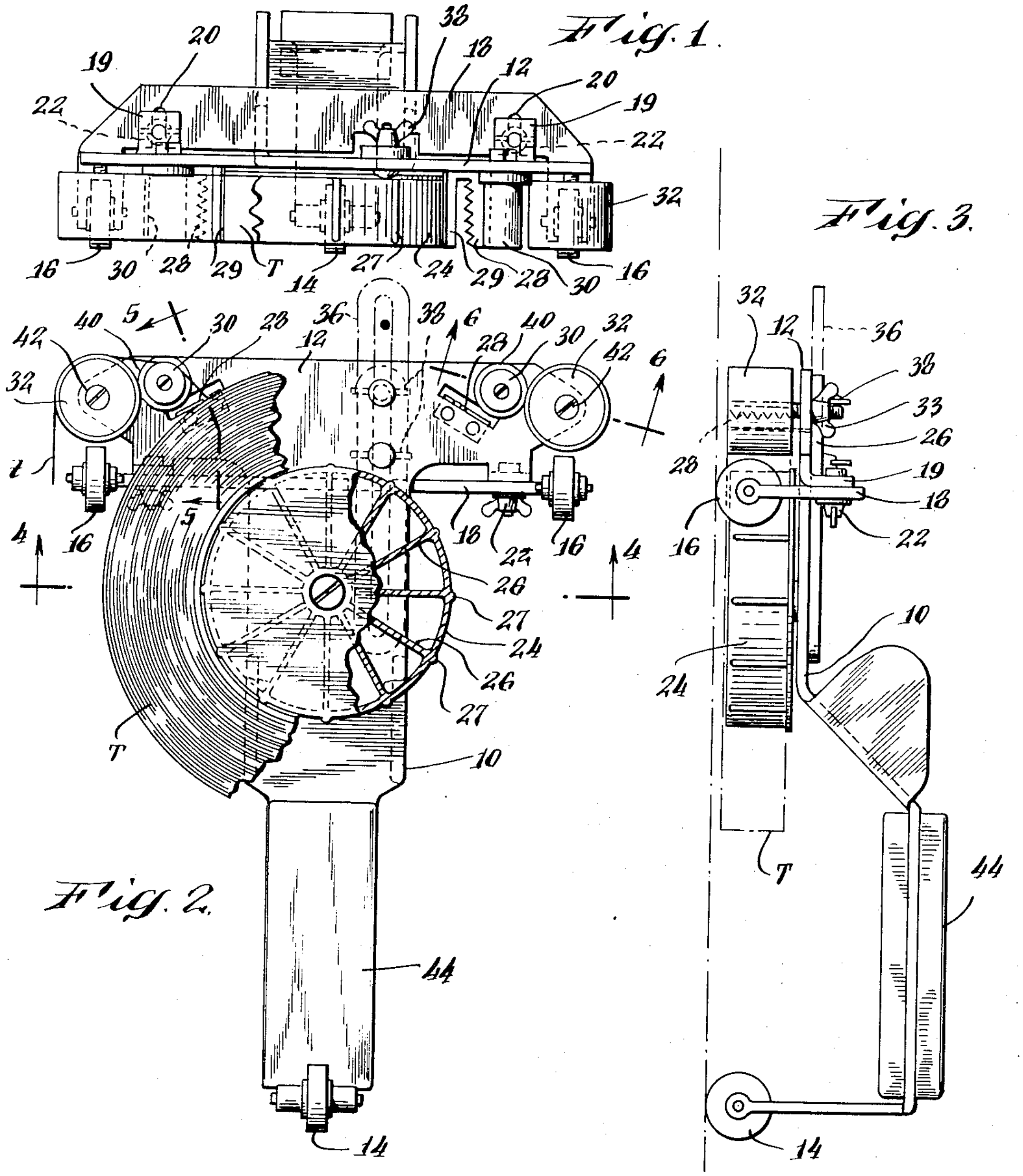
Figure 4:
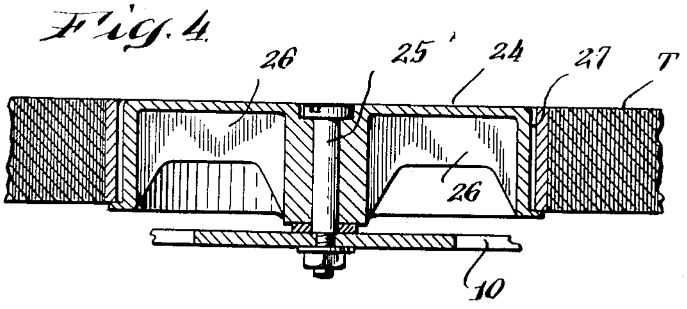

As shown in FIG. 1 a cutter guard 29 may be provided in association with each cutter 28.

Desirably a smooth face plate 46, of metal or plastic for example, is provided at the inner face of each pressure roll 32 to prevent wear of the roller and also to prevent the rubber or other composition of the roller from rubbing off onto the wall angularly adjoining the wall on which tape is applied. A face plate 44 is shown in FIG. 6 which also illustrates how a pressure roll may be locked in adjusted position by means of the wing nut 33 on the threaded end of member 42 which extends through the frame. As shown each pressure roll comprises a sleeve 48 adjustable axially of member 42 for moving the pressure roll toward and away from the supporting frame.

Figures 16, 17:
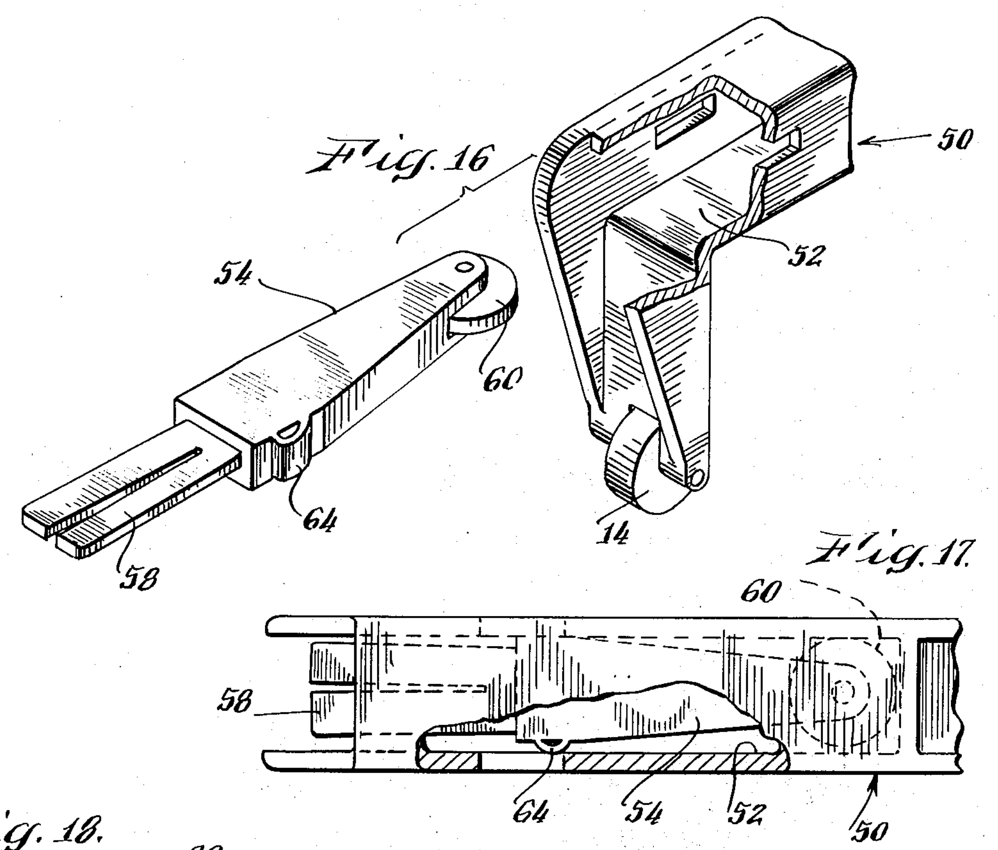
FIG. 16 is an exploded view in perspective of a laterally extending guide member and of the rear end of a modified form of tape applicator frame, cut away to show a chamber in which the guide member may be stored.
FIG. 17 is a top plan view of the modified frame portion shown in FIG. 16 with the laterally extending guide member stored therein.

In FIGS. 16 and 19 a modified longitudinal frame member 50 is shown provided with an internal storage space 52 adapted to receive therein when not in use an abutment member 54. The longitudinal frame member 50 is provided with a transversely extending socket 56 adapted to receive the rearward extension 58 of the abutment member 54, and thereby position the abutment member projecting laterally from the longitudinal frame member 50. As shown the abutment member 54 carries at its outer end the wheel 60 adapted to travel on a surface 62 such as a ceiling, or the portion of a wall surface above the operator's reach.

The length of member 54 is such that when its rearwardly projecting portion 58 is inserted in the transverse socket 56 in the longitudinal frame member the outer peripheral portion of the wheel 60 will project from the center line of the longitudinal frame member substantially the same distance as the periphery of the applicator roll 32 over and around which the tape extends from the guide means 30, and which serves not only to bring the tape into contact with the first surface but also to press it against the said surface so that it will adhere to the surface.

As shown in FIGS. 16, 17 and 18 a yielding distortable spring member 64 is provided projecting from the abutment member 54, and serving, when the member 54 is inserted in the storage chamber 52 within the longitudinal frame member, to hold the abutment member in place to prevent is from falling out from the storage chamber, as for example when the device is being used without the abutment member.

In FIGS. 18 and 19 the tape applying device is shown placed against a wall surface with the lateral abutment member seated in socket 56 and with its wheel 60 in contact with a ceiling, and with an extension arm 70 loosely and pivotally engaged with the longitudinal frame member 50 as by insertion of the pin 72 at the forward end of the extension arm inserted in a hole or socket 74 in the frame member, the hole being of sufficiently greater diameter than the pin 72 to provide in effect a universal joining and to allow the pin and therefore the extension handle 70 to be swung both toward and away from the surface on which the applicator device is placed and also in a plane parallel to the said surface to facilitate movement of the carriage above the reach of the operator. It will be understood that by the extension arm 70 the carriage may be held and readily moved on said second surface with the wheel 60 at the outer end of the abutment member 54 in contact with the ceiling 62, and that the operator may move the carriage walking along a wall without maintaining a precise position of the extension arm while the lateral abutment is kept in contact with the ceiling or other adjoining surface. The angular movement provided for arm 70 relative to the carriage allows the device to be moved freely around and over door or window frames, and other projections from the wall.

List of parts

10 longitudinal frame member
12 cross frame member
14 roller at rear end of frame
16, 16 rollers under ends of 12
18 cross bar carrying rollers 16, 16
19 brackets on 12
20 slots in 18
22 "pins"-thumb screws extending through 20 into 19
24 hub, rotatable
T tape roll on 24
25 bearing-screw on which 24 is rotated and by which it is attached to the frame
26 radial webs of 24
27 knobs on periphery of 24
28 cutters
29 cutter guard
30 guide rolls
32 pressure rolls (has 46 & 48)
33 wing nut—locking means for 32
34 stop-spacing member
36 longitudinal slot in 34
38 thumb screw extending through 36 into frame
40 shoulder on 30
42 bearing shaft for 30 and for 32
44 offset handle portion of longitudinal frame member 10
*t* tape unwound from 24
46 face plate on inner face of pressure roll
48 sleeve of 32 through which 42 extends
50 modified frame member
52 internal storage space in 50
54 abutment member
56 transverse socket to receive 54
58 rearward extension of 54
60 wheel at outer end of 54
62 ceiling
64 distortable member projecting from side of 54
70 extension arm
72 pin at front end of 70
74 hole in frame member to receive 72

I claim:

1. The method of applying tape to a first surface adjoining and angularly related to a second surface which comprises, providing a carriage with wheels adapted to travel over said second surface and with means for mounting a roll of tape for rotation in a plane parallel with the second surface, providing guide means for directing tape laterally as it is unwound from a tape roll mounted on the mounting means, and employing pressure applicator means to place the tape on the first surface and to apply pressure on the tape as it is applied on said first surface.

2. The method claimed in claim 1 including the step of employing a laterally extending arm and a roller supported thereon for making a rolling contact with the first surface and serving as a guide and abutment and spacing member while the tape is applied on said first surface.

3. The method claimed in claim 1 in which the pressure roll is disposed to press only upon the inner edge portion of the tape as it is applied to the first surface.

4. The method claimed in claim 1 including the steps of providing a handle arm and means for pivotally and loosely connecting it to the carriage for swinging movement relative to the carriage, and employing a laterally extending guide arm and spacing member adapted to be held against the first surface while the tape is applied thereon by using the handle arm to advance the carriage over the second surface.

5. The method claimed in claim 1 including the step of pivotally connecting one end of an extended handle to the carriage so that the carriage may be moved over the second surface above the reach of the operator and so that the extension handle may be swung through various angles relative to the carriage for moving the carriage around areas projecting from the second surface including door and window frames and the like.

6. The method claimed in claim 1 including the step of making the position of the tape roll mounting means adjustable toward and away from the wall over which the carriage is moved to compensate for differences in the width of rolls of tape and to bring a side surface of the tape roll close to the wall so that the tape will be applied with an edge close to that wall without rubbing against the wall.

7. The method claimed in claim 1 including the step of providing cut off means disposed relative to the guide and pressure applicator means so that the tape may be drawn back against the cut off means and cut off when desired, as by stopping rotation of the tape roll while the carriage is moving or by grasping the tape roll and rotating it in direction opposite to that when tape is discharged.

8. The method claimed in claim 1 including the step of limiting lateral movement of the tape as it travels past the said guide means.

References Cited

UNITED STATES PATENTS

| | | | |
|---|---|---|---|
| 3,364,096 | 11/1968 | Hetes | 156—577 |
| 3,463,694 | 8/1969 | De Roshia | 156—577 X |
| 3,536,569 | 10/1970 | Gosnell | 156—577 X |
| 3,567,557 | 3/1971 | Kingery et al. | 156—523 |

EDWARD G. WHITBY, Primary Examiner

U.S. Cl. X.R.

156—523, 527, 577, 579